INVENTOR.
Alexander O. Bally
BY
William D. Fosdick
AGENT

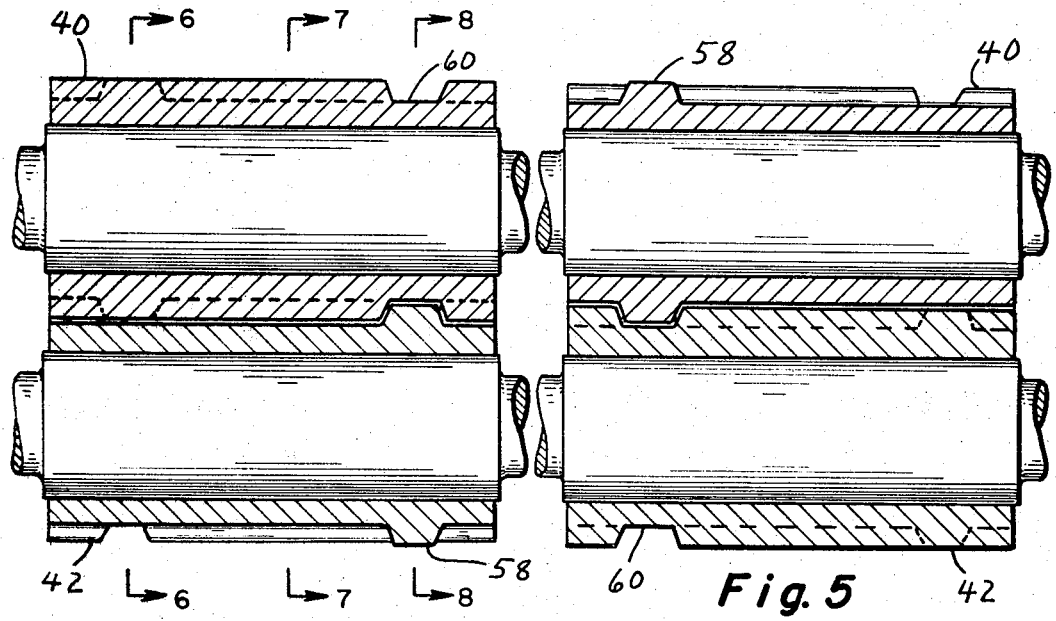
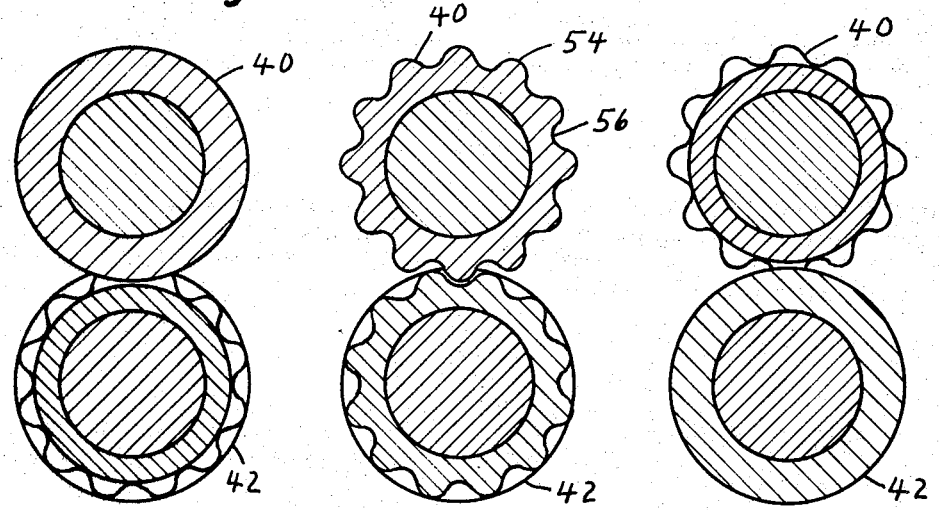
Fig. 4   Fig. 5   Fig. 6   Fig. 7   Fig. 8

Jan. 7, 1969 A. O. BALLY 3,419,937
FILTER AND METHOD AND APPARATUS FOR ITS PRODUCTION
Original Filed Aug. 13, 1965 Sheet 3 of 5

INVENTOR.
Alexander O. Bally
BY
William D. Fosdick
AGENT

Jan. 7, 1969 A. O. BALLY 3,419,937
FILTER AND METHOD AND APPARATUS FOR ITS PRODUCTION
Original Filed Aug. 13, 1965 Sheet 5 of 5

INVENTOR.
Alexander O. Bally
BY
William D. Fosdick
AGENT

United States Patent Office 3,419,937
Patented Jan. 7, 1969

3,419,937
FILTER AND METHOD AND APPARATUS FOR ITS PRODUCTION
Alexander O. Bally, Corning, N.Y., assignor to Corning Glass Works, Corning, N.Y., a corporation of New York
Original application Aug. 13, 1965, Ser. No. 479,561, now Patent No. 3,346,121, dated Oct. 10, 1967. Divided and this application June 15, 1967, Ser. No. 656,978
U.S. Cl. 18—10                    1 Claim
Int. Cl. B29d 7/14

ABSTRACT OF THE DISCLOSURE

A pair of intermeshing rollers for forming a filter body. Each of the rollers has longitudinal corrugations and at one end a raised cylindrical portion having a radius equal to the maximum radius of the roller at the tops of the corrugations and at the other end an indented cylindrical portion having a radius equal to the minimum radius of the roller at the bottoms of the corrugations. The rollers intermesh such that the raised cylindrical portion of one roller projects into the indented cylindrical portion of the other roller. A filter material is fed between the rollers in order to form a corrugated sheet in which the channels formed by adjacent corrugations are blocked off at opposite ends. Corrugated sheets and flat filter sheets are subsequently sealed together to form a filter body.

---

This application is a division of my copending application Ser. No. 479,561, filed on Aug. 13, 1965 and now Patent No. 3,346,121.

This invention relates to improved structures for use in filtering liquids and gases and to improved methods and apparatus for the production of such structures.

In U.S. Patent 3,112,184, to R. Z. Hollenbach, there is described a method for producing light-weight ceramic honeycomb structures useful, for example, as heat exchangers. The Hollenbach process involves depositing pulverized ceramic materials and a binder on a flexible carrier, corrugating the carrier, forming an article of a desired shape from such corrugated carrier, and thereafter firing the article to sinter the ceramic particles to produce a unitary structure which may have walls of controlled porosity, which structure includes a plurality of continuous channels extending between opposed surfaces of the structure.

It is an object of the present invention to modify the process of Hollenbach in order to render the process suitable for the production of filters.

It is a further object of the present invention to provide a general method and apparatus for the production of filters from formable thin filter materials.

A further object of the invention is the production of a strong, light-weight filter having the ability to withstand high temperatures and the action of corrosive fluids.

These and other objects, which will be apparent from the detailed description of the invention, are accomplished by shaping a formable filter material by passing the material between forming rollers having corrugated intermeshing surface portions with particular configurations hereinafter described and subsequently forming a filter structure comprising alternate layers of a spacer material and the formed filter material.

Figure 1:
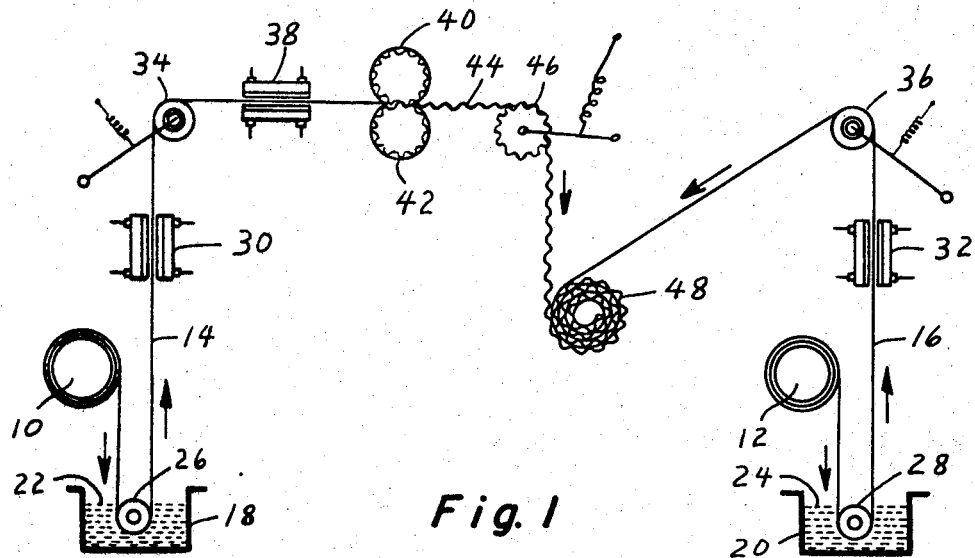
Figure 2:
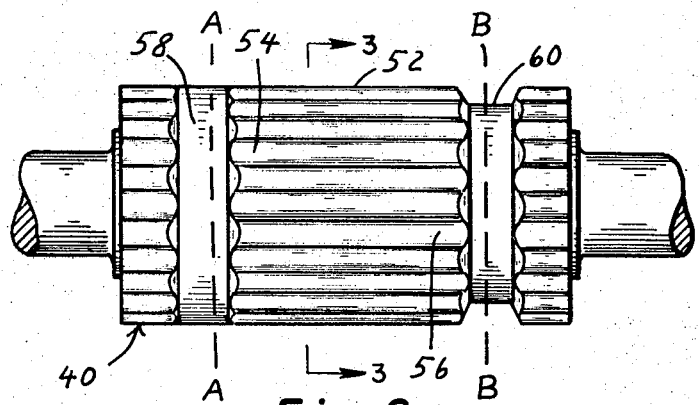
Figure 3:
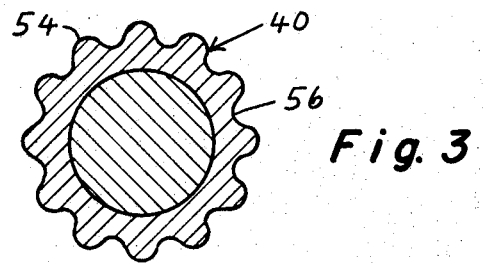
Figure 9:
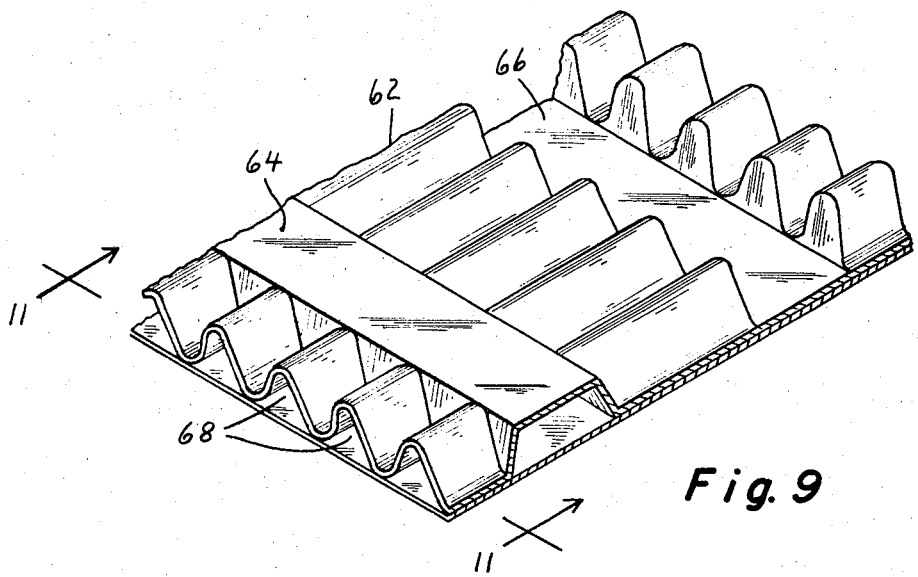
Figure 10:
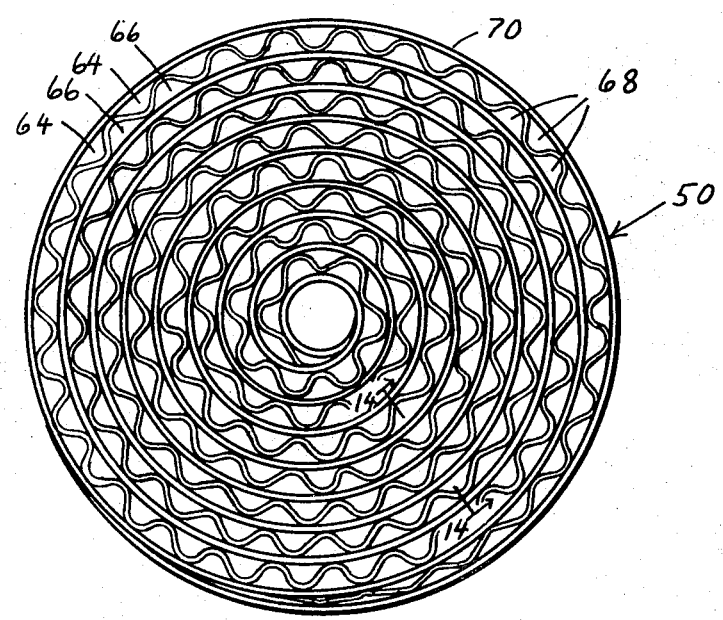

The invention will be described with reference to the accompanying drawing, in which:

FIGURE 1 is a schematic representation of the apparatus used in the invention,

FIGURE 2 is a side elevational view of one of the forming rollers utilized in the invention, FIGURE 3 is a sectional view taken on line 3—3 of FIGURE 2, FIGURE 4 is an axial sectional view taken through the two intermeshing rollers of FIGURE 1, FIGURE 5 is a view similar to that of FIGURE 4, with the rollers rotated slightly, FIGURE 6 is a sectional view taken on line 6—6 of FIGURE 4, FIGURE 7 is a sectional view taken on line 7—7 of FIGURE 4, FIGURE 8 is a sectional view taken on line 8—8 of FIGURE 4, FIGURE 9 is a perspective view of a segment of formed filter material bonded to a single sheet of spacer material, FIGURE 10 is a top plan view of a spirally wound filter structure according to the invention.

Figure 11:
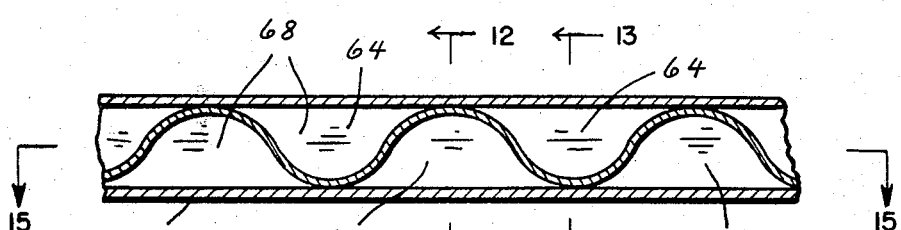
Figure 12:
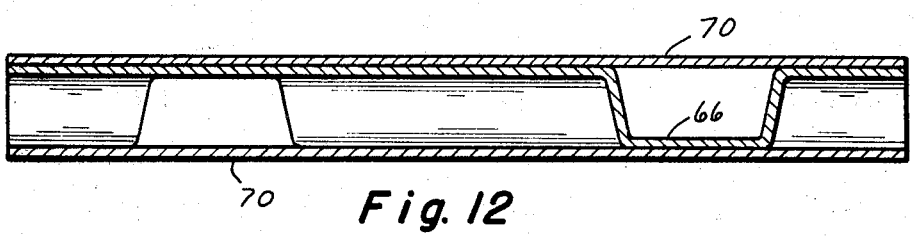
Figure 13:
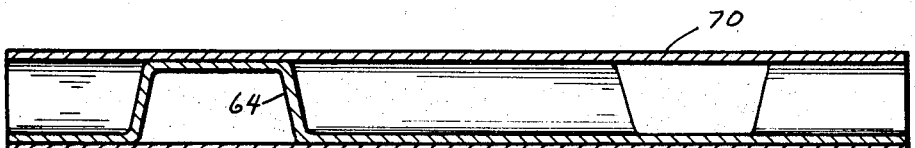
Figure 14:
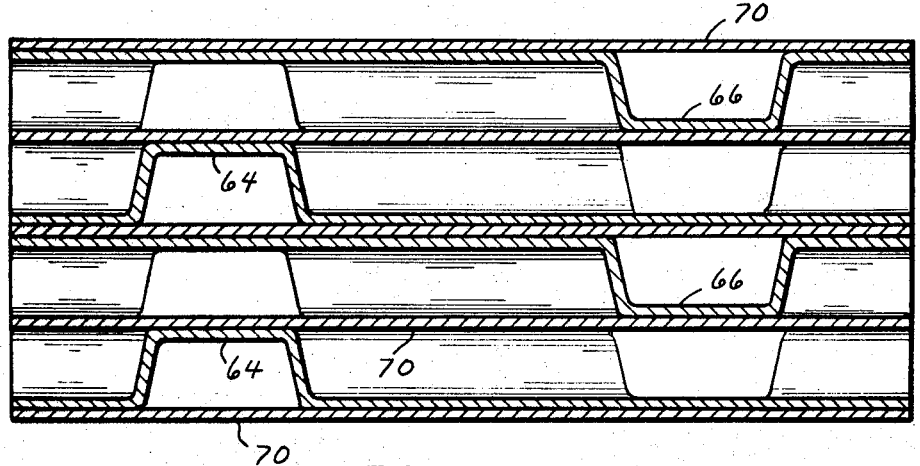
Figure 15:
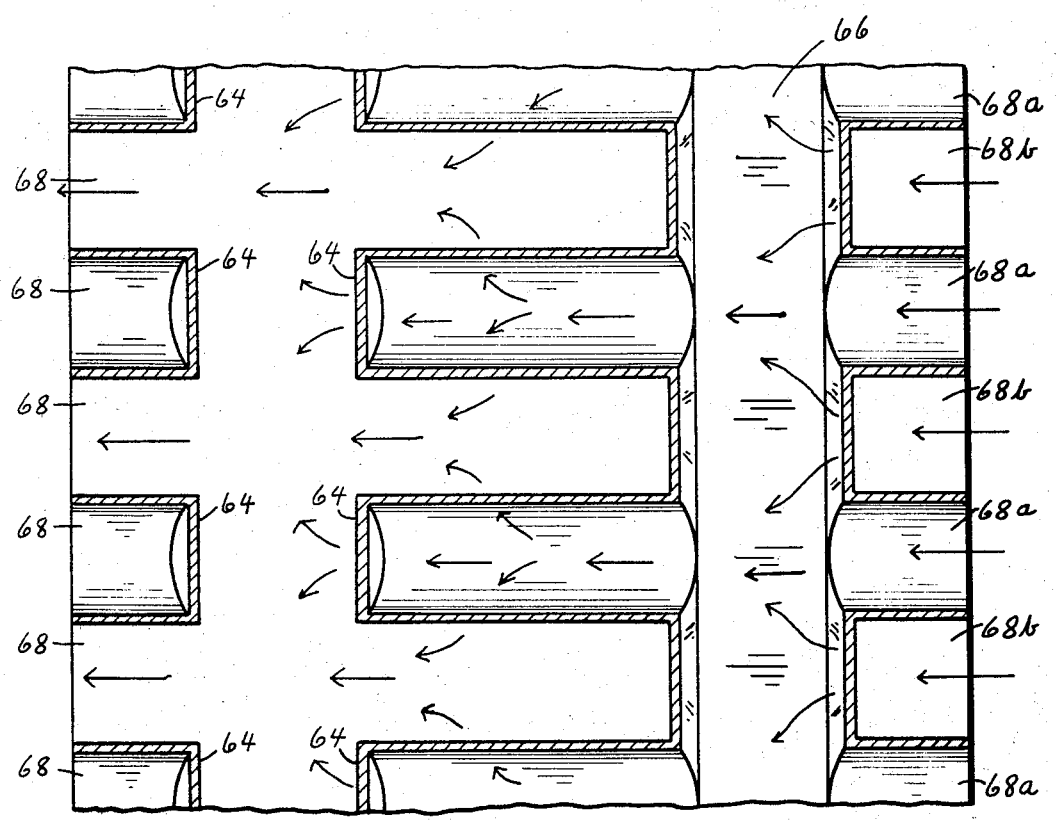

FIGURE 11 is an end view of the filter material of FIGURE 9, taken on line 11—11 of FIGURE 9, with the addition of a second layer of spacer material, FIGURE 12 is a sectional view taken on line 12—12 of FIGURE 11, FIGURE 13 is a sectional view taken on line 13—13 of FIGURE 11, FIGURE 14 is a sectional view taken on line 14—14 of FIGURE 10, and FIGURE 15 is a sectional view taken on line 15—15 of FIGURE 11, rotated clockwise by 90°, with the addition of arrows illustrating the direction of flow of a fluid through the filter material.

Referring to FIGURE 1, reels 10 and 12 contain suitable carrier materials 14 and 16, which materials may be, for example, porous natural cellulose paper, commonly referred to as 3½ pound teabar paper. The carrier materials are drawn through vessels 18 and 20, containing suspensions 22 and 24, which suspensions comprise a finely divided sinterable inorganic ceramic material, a binder and a solvent for such binder. The sinterable ceramic material may consist of 95 parts by weight of a petalite and 5 parts by weight of talc ($3MgO \cdot 4SiO_2 \cdot H_2O$) ground to a particle size of −200 mesh. The solution may consist of 45 grams of epoxy resin "Hysol 6111," 2.61 grams of hardener F-1 and 90 cc. of solvent consisting of a mixture of toluene and butyl alcohol. "Hysol 6111" is an epoxy hydroxy polyether resin sold by Houghton Laboratories, Inc. "F-1" is the trade name applied to the particular hardener for curing "Hysol 6111" and consists of a mixture of primary and secondary amines. Inasmuch as the various constituents of the suspension are described in detail in the above-mentioned Hollenbach patent, the disclosure of which is hereby incorporated by reference into the present specification, further detail regarding such constituents will be omitted here. Idler rollers 26 and 28 insure that the carrier is completely immersed in the suspension. The coated carriers pass through heating chambers 30 and 32. The partially dried carrier materials with their coatings of inorganic materials and binder subsequently pass over tensioning rollers 34 and 36. Carrier 14 subsequently passes through a second heating chamber 38 and between crimping rollers 40 and 42, where the coated carrier is formed into the crimped filter material 44 utilized in the filter structure of the invention. The crimped filter material passes over the second tensioning roller 46, and the crimped material and the smooth spacer material are spirally wound in alternate layers over take-up roller 48. Due to the fact that the smooth spacer strip 16 has passed through only one heating chamber, the ceramic suspension is still in a tacky condition and holds the alternate crimped and smooth layers together when the wound body is removed from the take-up reel. The body is then removed from the reel and placed in a furnace and heated at the rate of about 25° C. per hour to 400° C. and held at this temperature for about 1 hour. Further heating is then effected up to 1200° C. at a rate of about 100° C. per hour and then to 1250° C. at about 25° C. per hour, and the body is then held at 1250° C. for about 4 hours. The body is then cooled to about 100° C. in 16 hours and removed from the furnace. The result is the sintered unitary structure 50 illustrated in FIGURE 10.

The filter material is crimped into its characteristic form by rollers 40 and 42. As illustrated in FIGURES 2–8, rollers 40 and 42 are identical to one another, and each roller comprises a surface, such as surface 52 of roller 40 of FIGURE 2, which comprises a plurality of longitudinal corrugations comprising adjacent ridges 54 and grooves 56. Near one end of each roller the grooves are filled in, resulting in a cylindrical roller portion 58 having a radius equal to the radius of the corrugated roller surface at the peaks of ridges 54. Near the remaining end of the roller a second cylindrical roller portion is formed by cutting away ridges 54 to form a cylindrical surface 60 having a radius equal to the radius of the corrugated portion of the roller surface at the bases of the grooves.

As is illustrated in FIGURES 4–8, the corrugated surfaces of rollers 40 and 42 intermesh, thereby producing a basically corrugated filter material, such as corrugated filter sheet 62 of FIGURE 9. As illustrated in FIGURES 4 and 5, the rollers are oriented with respect to one another such that the larger cylindrical portion 58 of one roller is opposed to the smaller cylindrical portion 60 of the other roller. Consequently, the formed filter sheet 62 contains flat uncorrugated areas near each end thereof, one flat area 64 being at a location corresponding to the peaks of the corrugation ridges, and the other flat area 66 being in a location corresponding to the lowermost points of the grooves of the corrugations. Thus, when porous sheet 62 is sandwiched between two flat sheets, which may be either porous or non-porous, channels 68 are alternately blocked by portions 64 and 66 near alternate ends of the channels.

The effect of the blocking of alternate ends of channels 68 by means of portions 64 and 66 is illustrated in FIGURE 15, wherein the arrows illustrate the paths of a fluid through the filter. The fluid enters each of channels 68 from the right hand side of FIGURE 15. Fluids passing into the channels designated as 68a freely passes the lower indented portion 66 and continues until it reaches the raised portion 64. At this point it can travel no further without passing through the walls of the porous filter material, thereby causing particles to be filtered out of the fluid. Similarly, fluid entering the channels designated as 68a travels without obstruction only as far as indented portion 66, at which time it must pass through the filter material. Thus, all liquid passing through the filter must pass through the walls of the filter material at least once. As can be seen from examination of FIGURE 15, it is not necessary for the fluid to pass through the flat spacer sheet, and, accordingly, the flat sheet may be either impervious or pervious to the fluid being filtered.

Although, according to a preferred embodiment of the invention, the corrugated sheet is made of a porous material, such as not essential if the flat spacer sheet is porous. It is sufficient for the practice of the invention that at least one of the types of sheet be porous. For the most rapid filtering action it is preferable that both the flat sheet and the corrugated sheet be formed of porous materials.

The indentations in rollers 40 and 42 have been placed not at the extreme ends thereof, but rather at locations spaced from the ends by small distances. The purpose of such arrangement is to provide increased structural strength in the filter body produced thereby. Due to the fact that indented portions 64 and 66 of the corrugated filter material each comprises a flat area and two side wall areas, the resistance of the corrugated material to crushing is greatly increased. If structural strength is not a critical factor, cylindrical portions 58 and 60 of rollers 40 and 42 may be replaced by other surface portions forming continuous paths corresponding to the highest and lowest point of the roller corrugations. Thus, for example, if structural strength is not required in the finished product, roller 40 of FIGURE 2 may be modified by removal of the end portions defined by the broken lines A—A and B—B. Roller 42 would of course, be similarly modified.

Although particularly effective filters are made according to the process illustrated in the above description, filter materials other than that described may be formed into filter structures according to the process of the invention. Furthermore, crimped filter sheets and flat spacer sheets may be stacked rather than wound, in a manner similar to that illustrated in FIGURE 2 of the above-mentioned Hollenbach patent. Similarly, further variations from the descriptions of the process, apparatus and article described above may be made within the scope of the invention. Accordingly, it is intended that the scope of the invention be limited only by the scope of the appended claims.

I claim:

1. Means for forming a material useful in a filter body which means comprises a pair of rollers having longitudinal corrugations in the form of ridges and grooves, each said roller having in the vicinity of one end thereof a raised cylindrical portion having a radius substantially equal to the maximum radius of said roller at the locations of said ridges and in the vicinity of its remaining end an indented cylindrical surface portion having a radius substantially equal to the minimum radius of said roller at the locations of said grooves, said rollers being rotatably mounted with respect to one another such that said ridges and grooves intermesh and said raised surface portion of one said roller is opposed to said indented surface portion of the other said roller, and means for feeding between said rollers a sheet of deformable filter material.

References Cited

UNITED STATES PATENTS

| | | | |
|---|---|---|---|
| 19,116 | 1/1858 | Asterdam | 18—10 X |
| 1,159,812 | 11/1915 | Tucker | 18—10 |
| 1,954,635 | 4/1934 | Leonard | 18—0 |
| 2,429,482 | 10/1947 | Munters | 18—10 X |
| 3,283,378 | 11/1966 | Cramton | 18—10 X |

WILLIAM J. STEPHENSON, *Primary Examiner.*

U.S. Cl. X.R.

18—19